United States Patent [19]

Johnstone

[11] 4,390,953

[45] Jun. 28, 1983

[54] UNMANNED DIAGNOSTIC COMMUNICATIONS SYSTEM FOR COMPUTER CONTROLLED MACHINE TOOLS

[75] Inventor: Richard Johnstone, Brookfield, Wis.

[73] Assignee: Kearney & Trecker Corporation, Milwaukee, Wis.

[21] Appl. No.: 281,019

[22] Filed: Jul. 6, 1981

Related U.S. Application Data

[63] Continuation-in-part of Ser. No. 205,102, Nov. 10, 1980, abandoned.

[51] Int. Cl.³ .............................................. G06F 15/46
[52] U.S. Cl. ..................................... 364/474; 364/138; 364/167; 364/900
[58] Field of Search ............... 364/474, 475, 551, 171, 364/167, 138, 139, 184, 185, 186, 200 MS File, 900 MS File, 131, 132; 179/2 A, 2 DP, 6.02, 6.03, 6.07, 5 R, 5 P, 90 BD; 340/825.17, 825.23

[56] References Cited

U.S. PATENT DOCUMENTS

| | | | |
|---|---|---|---|
| 3,629,859 | 12/1971 | Copland | 340/172.5 |
| 3,825,901 | 7/1974 | Golnek et al. | 340/172.5 |
| 3,882,305 | 5/1975 | Johnstone | 340/172.5 |
| 3,910,322 | 10/1975 | Hardesty et al. | 340/172.5 |
| 3,916,177 | 10/1975 | Greenwald | 253/153 |
| 3,969,584 | 7/1976 | Miller et al. | 179/2 A |
| 4,000,371 | 12/1976 | Ogawa | 179/2 DP |
| 4,126,762 | 11/1978 | Martin et al. | 179/2 A |
| 4,215,243 | 7/1980 | Maxwell | 179/2 DP |

Primary Examiner—Joseph F. Ruggiero
Attorney, Agent, or Firm—Quarles & Brady

[57] ABSTRACT

An unmanned diagnostic communications system for analyzing the operation of a remotely situated computer controlled machine tool and for diagnosing any abnormalities disclosed during machine tool operation includes an auto dialer and MODEM coupled between the computer controlled machine tool and one end of a communications channel and an auto answer MODEM coupled between the other end of the communications channel and a diagnostic computer. In response to a test command entered by an operator to the remotely situated computer controlled machine tool or a machine tool initiated test command, the auto dialer automatically establishes a communications link with the diagnostic computer through the auto answer MODEM. Thereafter, the diagnostic computer determines the identity of the remotely situated computer controlled machine and then transmits instructions to the computer controlled machine tool to direct its operation. In accordance with the program instructions from the diagnostic computer, the computer controlled machine tool transmits data indicative of machine tool operating characteristics to the diagnostic computer which analyzes such data to detect and diagnose any machine tool abnormalities.

7 Claims, 3 Drawing Figures

UNMANNED DIAGNOSTIC COMMUNICATIONS SYSTEM FOR COMPUTER CONTROLLED MACHINE TOOLS

BACKGROUND OF THE INVENTION

This application is a continuation-in-part of U.S. patent application Ser. No. 205,102 filed on Nov. 10, 1980 and now abandoned.

The invention described herein relates to computer controlled machine tools, and more specifically to an unmanned diagnostic control apparatus for automatically analyzing computer controlled machine tool operation and to diagnose any abnormalities disclosed during machine tool operation.

With the advent of computer numerically controlled (CNC) machine tools, machining operations which heretofore had been performed by a skilled machinist, can now be performed automatically by the CNC machine tool in accordance with programmed instructions executed by the CNC machine tool control system computer. In addition to reducing direct labor costs, use of computer numerically controlled machine tools assures part uniformity because for so long as the computer controlling the CNC machine tool executes the same program, each part produced by the CNC machine tool will be identical to each preceding part produced thereby.

Due to their tremendous sophistication, such computer numerically controlled machine tools are often quite complex. Although great care is taken during their design to assure troublefree operation for long intervals, should a malfunction develop, machine tool complexity often forces skilled repair personnel to expend considerable effort and time to diagnose the cause of the CNC machine tool malfunction. Since the per hour charge of such skilled repair personnel is often costly, and since machine tool down time often results in production delays which are very costly too, it is very important that the diagnosis and correction of machine tool malfunctions be made as quickly as possible.

To facilitate rapid diagnosis of machine tool malfunctions, I developed the diagnostic communications system described and claimed in U.S. Pat. No. 3,882,305 issued to me on May 6, 1975 and assigned to the assignee of the present invention. The diagnostic communications system described in my patent includes a pair of MODEMS, that is, modulator/demodulators, for coupling a remotely situated computer controlled machine tool across a communication channel to a diagnostic computer which stores diagnostic programs for analyzing the operation of the remotely situated computer controlled machine tool. In operation, linkage is established between the remotely situated computer controlled machine tool and the centrally located diagnostic computer by voice communication between the machine tool operator and the computer analyst at the diagnostic site. Thereafter, both the computer analyst and the machine tool operator condition their corresponding MODEM to enable digitally encoded information to be transmitted between the diagnostic computer and the remotely situated computer controlled machine tool. The digitally encoded information consists of instructions transmitted from the diagnostic computer to the computer controlled machine tool and machine tool characteristics, sensed during machine tool operation responsive to the previously received instructions from the central diagnostic computer.

One of the drawbacks associated with the diagnostic communication system described in my U.S. Pat. No. 3,882,305 is that an analyst must be present at the diagnostic computer site to facilitate communication between the remotely situated computer controlled machine tool and the diagnostic computer. If it were possible to automatically establish communications between the diagnostic computer and the remotely situated computer controlled machine tool in response to a test command entered to the remotely situated computer controlled machine tool by an operator upon detection of any abnormality disclosed during machine tool operation, then the need for an analyst at the diagnostic computer site could be obviated or, the analyst could be freed to perform other duties, thereby effecting a sizable savings in labor costs.

It is an object of the present invention to provide a diagnostic communication computer system for analyzing the operation of a computer controlled machine tool and for diagnosing machine tool abnormalities during machine tool operation.

It is a further object of the present invention to provide an unmanned diagnostic communication computer system for automatically analyzing the operation of a computer controlled machine tool and for diagnosing machine tool abnormalities disclosed during machine tool operation.

BRIEF SUMMARY OF THE INVENTION

Briefly, in accordance with the preferred embodiment of the invention, a diagnostic communication computer system is programmed to monitor the operation of a remotely situated computer numerically controlled machine tool and to diagnose any machine tool abnormalities developed during machine tool operation. Means are provided, in the form of an auto dialer and MODEM connected to the remotely situated computer controlled machine tool and, an automatic answering MODEM coupled to the diagnostic computer, to automatically initiate a communications link across a communications channel such as a telephone line, between the diagnostic computer and the remotely situated computer numerically controlled machine tool in response to an operator initiated test command entered to the computer controlled machine tool or in response to a command generated by the machine tool computer itself. Following establishment of the communication link, the diagnostic computer interrogates the remotely situated computer controlled machine tool to ascertain its identity. Once the diagnostic computer is provided with information from the remotely situated computer controlled machine tool indicative of its identity, the diagnostic computer transmits control instructions to the computer controlled machine tool and, thereafter, receives information from the machine tool indicative of machine tool operating characteristics. By monitoring machine tool operation, the diagnostic computer can, in accordance with stored programs, diagnose any machine tool abnormalities disclosed during machine tool operations.

BRIEF SUMMARY OF THE DRAWINGS

The features of the invention believed to be novel are set forth with particularity in the appended claims. The invention itself, however, both as to organization and method of operation, together with the further objects and advantages thereof may best be understood by reference to the following description taken in conjunction with the accompanying drawings in which:

DETAILED DESCRIPTION OF THE PREFERRED EMBODIMENT

Figure 1:
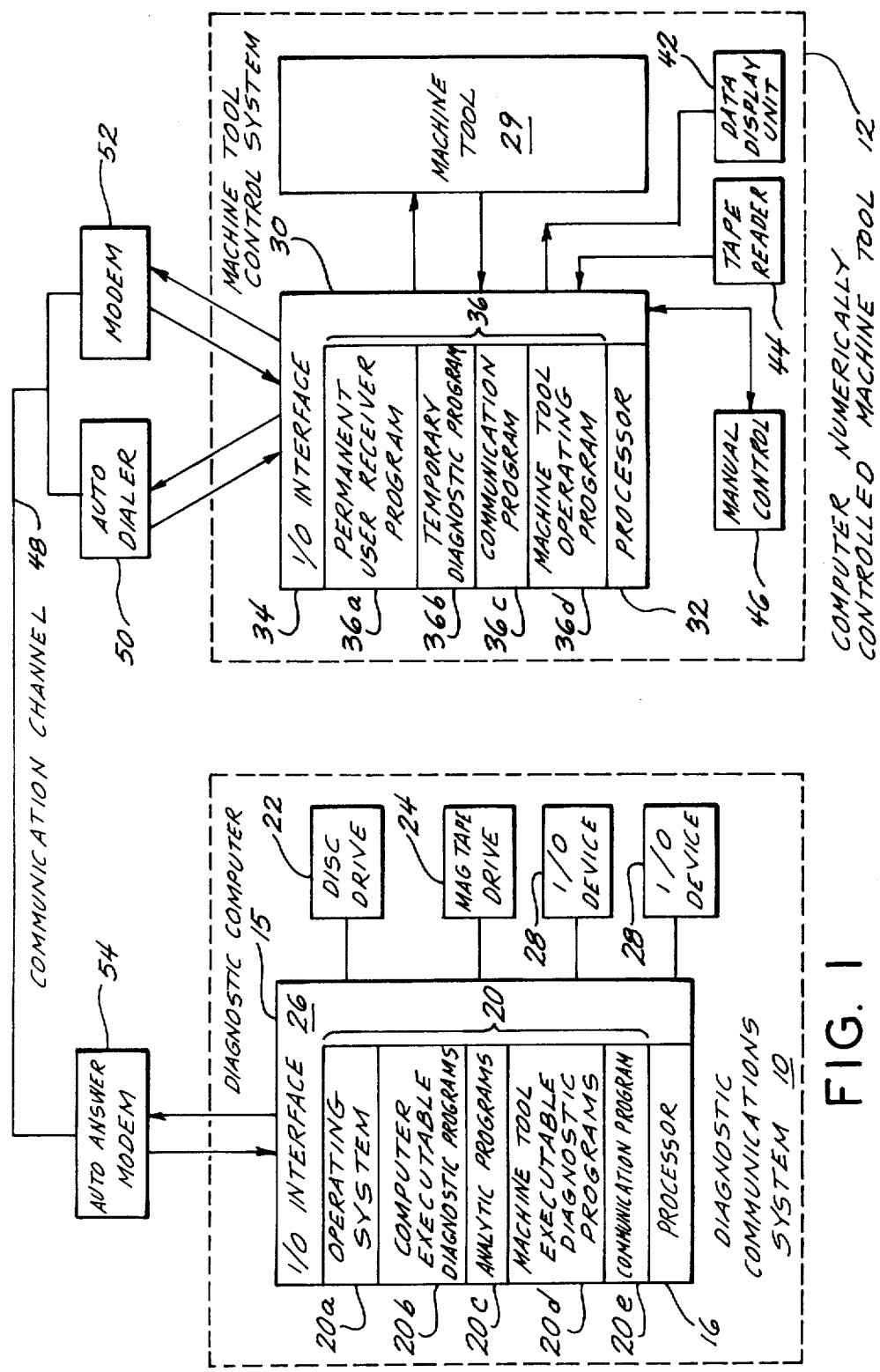
FIG. 1 is a block diagram of the diagnostic communication system according to the present invention.

FIG. 1 illustrates the preferred embodiment of an unmanned diagnostic communications computer system 10 for monitoring the operation of a computer numerically controlled machining center such as CNC machine tool 12, following an operator initiated test command entered to the CNC machine tool or a test command generated by the machine tool itself. In the presently preferred embodiment, diagnostic computer system 10 includes a diagnostic computer 15, configured substantially similar to the diagnostic computer described and claimed in my U.S. Pat. No. 3,882,305 (hereinafter incorporated by reference) and includes an electronic processor 16 which is coupled to a physical memory 20 having five logical memory blocks 20a, 20b, 20c, 20d and 20e, respectively, the five memory blocks each containing an operating system, a set of computer executable diagnostic programs, a set of analytical programs, a set of machine tool executable diagnostic programs and a communication program, respectively.

In addition to being coupled to memory blocks 20a through 20e, processor 16 is coupled to a disk drive 22 and to a magnetic tape drive 24 through an I/O interface 26. Disk drive 22 serves as the primary means for storing information concerning each of the CNC machining centers which may be interfaced to the diagnostic computer system for diagnostic analysis. The information on disk 22 concerning each CNC machining center includes data indicative of the machine type as well as machine design limit parameter data and data indicative of previously obtained machine operating characteristics which data, is referenced by the CNC machinery center serial number. Magnetic tape drive 24 serves as a back-up memory for disk drive 22 and may also be employed to initially input, and thereafter update, the programs stored in each of the memory blocks 20a, 20b, 20c, 20d and 20e. Even though diagnostic computer system 10 is designed for unmanned operation, it may be advantageous to configure diagnostic computer system 10 with one or more input/output devices 28, such as a CRT display, a high speed printer or a keyboard printer, all coupled through I/O interface 26 to processor 16. I/O devices 28 enables an analyst, if present, to monitor diagnostic computer 15 and CNC machining center 14 operation.

Each of the computer numerically controlled machining centers interfaced with diagnostic computer system 10 takes the form of computer numerically controlled machine tool 12 and includes a machine tool 29 which is coupled to and controlled by a machine tool control system 30. Although machine tool control system 30 may take the form of any well known machine tool control system, in the presently preferred embodiment, machine tool control system 30 is comprised of a CNC control system such as are manufactured by Kearney & Trecker Corporation and includes a processor 32 which is coupled through an I/O interface 34 to machine tool 29. Processor 32 is coupled to a memory 36 having four logical memory blocks 36a through 36d. Memory blocks 36a and 36d store a permanent user receiver program, a temporary diagnostic program, a communication program and a machine tool operating program, respectively.

Input/output (I/O) interface 34 also couples processor 32 to each of data display unit 42, tape reader 44 and manual controls 46. Tape reader 44 serves as the means by which each of the four programs stored in memory blocks 36a through 36d, respectively, is initially entered, and thereafter updated. Output data generated during machine operation, is displayed on display unit 42, typically comprised of a cathode ray tube or plasma display, to the machine tool operator. In response to data displayed on display unit 42, operator-initiated commands can be entered to processor 32 through manual controls 46. It is through manual control 46 that the operator-initiated test command is entered to processor 32 to initiate interface with diagnostic communications system 10.

To establish a communication link between CNC machine tool 12 and diagnostic communication system 10 across a communication channel 48, such as a long distance telephone link or a microwave channel connected at each end to a local telephone link, in response to an operated-initiated test command entered through manual controls 46 or in response to the command generated by the machine tool itself, an auto dialer 50 and a communication modulator/demodulator (MODEM) 52 are each coupled between one end of communication channel 48 and I/O interface 26 of diagnostic computer 15. An auto answer MODEM 54 is coupled between the other end of communications channel 48 and I/O interface 26 of diagnostic communication system 10. In response to a command from processor 32, as transmitted to the auto dialer through I/O interface 34, auto dialer 50 automatically accesses auto answer MODEM 54 through communications channel 48 by transmitting a unique identifying code (the telephone number of an auto answer MODEM 54) across communications channel 48. Auto answer MODEM 54 automatically responds to the identifying code transmitted by auto dialer 50 and, following transmission of the identifying code, the auto answer MODEM automatically interfaces diagnostic computer 15 to communications channel 48 to permit transmission of data thereacross between diagnostic communication system 10 and CNC machine tool 14.

Figure 2A:
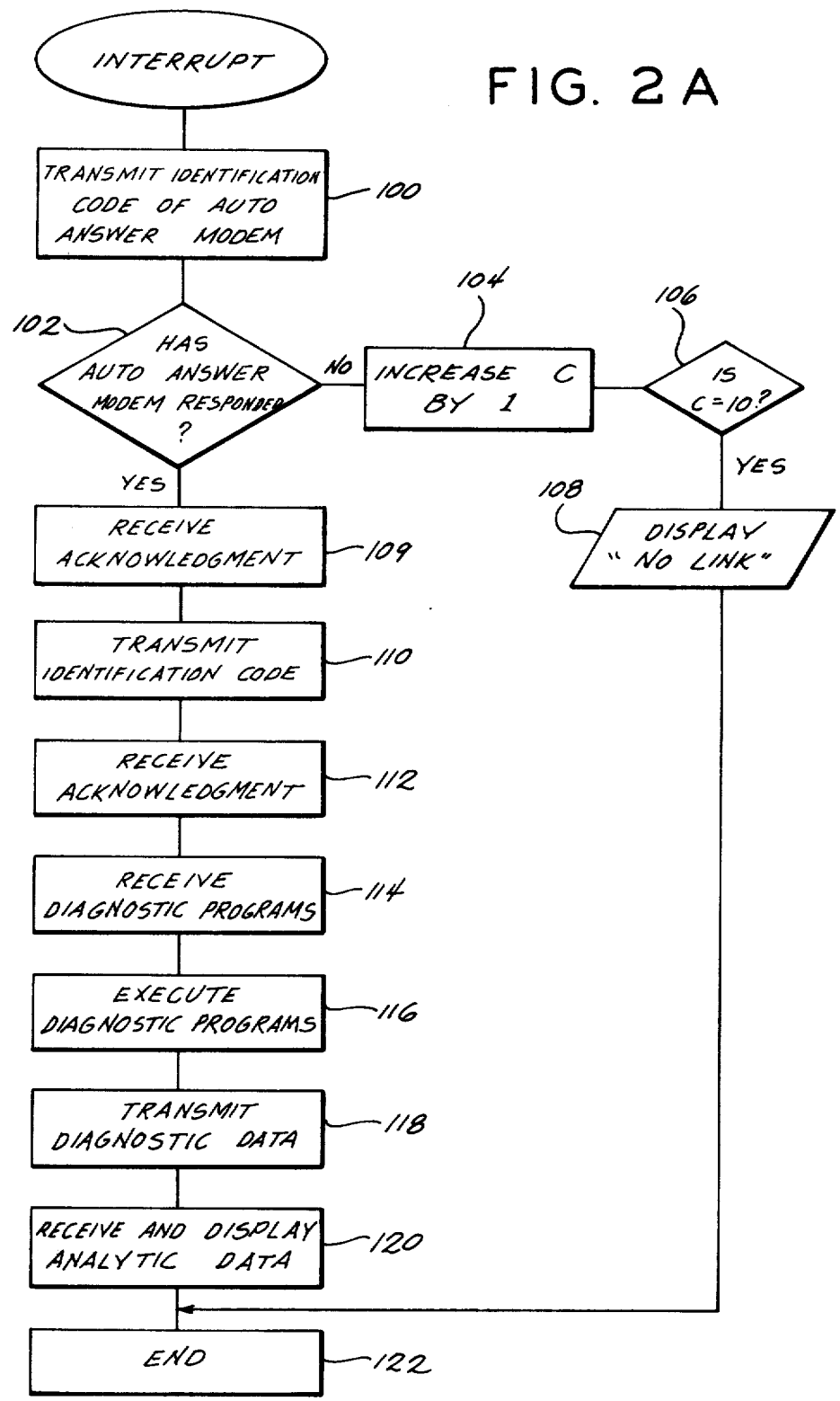
FIG. 2A is a flow chart representation of the communication program executed by the machine tool control system.
Figure 2B:
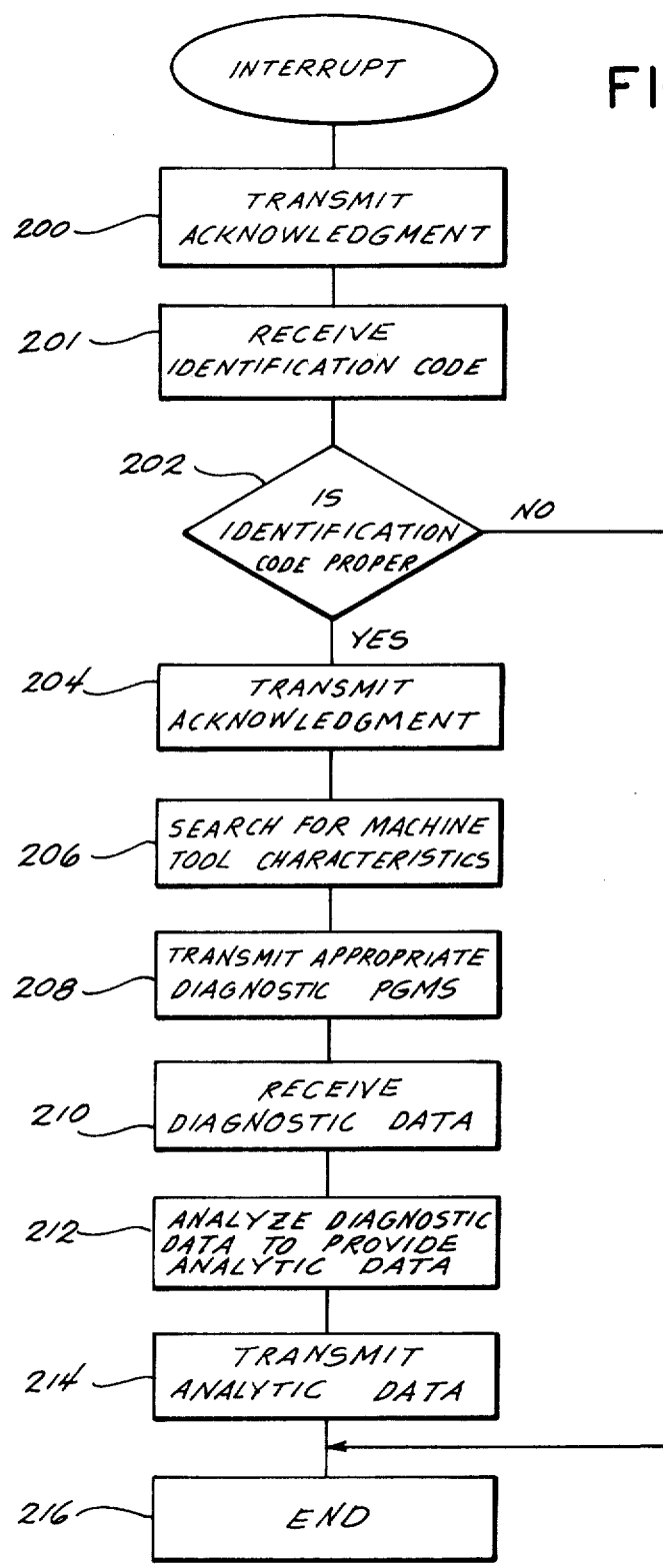
FIG. 2B is a flow chart representation of the communication program executed by the diagnostic computer of the diagnostic system of FIG. 1.

A more detailed understanding of the operation of the unmanned diagnostic communications system of the present invention may be gained by reference to FIGS. 2A and 2B which each illustrate in flow chart form, the communication program stored in memory block 36c of machine tool control system 30 and the communication program stored in memory block 20e of diagnostic computer 15, respectively. As will become clear hereinafter, the communications programs at each of the machine tool control system and the diagnostic computer, when executed simultaneously, enabled unmanned communication between the machine tool control system and the diagnostic computer.

Referring now to FIG. 2A which is a flow chart representation of the communication program stored in memory 36c (FIG. 1) of the machine control system, when an interrupt is generated responsive to actuation by the operator of one of controls of manual control 46 (FIG. 1) or when an interrupt is generated by the machine tool computer in response to an abnormal condition, execution of communication program of FIG. 2A is initiated. At the outset of communication program execution, auto dialer 50 (FIG. 1) operation is initiated, causing the auto dialer to transmit the identifying code (typically the telephone number) of the auto answer MODEM across the communication channel (step 100). Following the transmission of the identifying code of the auto answer MODEM, MODEM 52 (FIG. 1) is continuously monitored by the machine tool computer (step 102) to determine whether or not the auto answer MODEM has responded. As will become better understood by reference to FIG. 2B, the auto answer MODEM, when it is not otherwise occupied with answering another auto dialer, responds to the transmission of the identifying code from the machine tool by transmitting an acknowledge signal to MODEM 52 (FIG. 1). If, however, no acknowledge signal is received by MODEM 52 from the auto answer MODEM, then a count (initially 0) of an internal counter is increased by 1 (step 104). The count is tested (step 106) and if the value of the count is less than some predetermined number, typically 10, then auto dialer 100 retransmits (redials) the identifying code of the auto answer MODEM (step 100). Once the value of the count has reached 10, indicating that the auto dialer has unsuccessfully attempted to communicate with the auto answer MODEM 10 times, then the message such as "no link" is displayed on the CNC control unit display (step 108) to indicate that no communication link has been established.

In most instances, however, the auto answer MODEM responds to the identifying code received from the auto dialer by transmitting an acknowledge signal to MODEM 52. After the acknowledge signal from auto answer MODEM 54 is received (step 109), then processor 32 (FIG. 1) causes an identification code, typically the serial number of the machine tool, to be transmitted (step 110) to the diagnostic computer. Upon receipt of the identification code from the machine tool control system, the diagnostic computer transmits an acknowledgement notice which is received by the machine tool control system (step 112). As will be clearly understood by reference to FIG. 2B, once diagnostic computer 15 receives the identification code from the machine tool control system, the appropriate file containing the characteristics associated with machine tool 29 is then identified and the appropriate diagnostic program stored in memory locations 20b and 20d of diagnostic computer 15, is transmitted across communication channel 48 and is received by machine tool control system 30 (step 114).

Referring now to FIG. 2B, there is shown in flow chart form the details of the communications program stored in memory location 20e, which, as alluded to earlier, is executed by processor 16 while processor 32 executes the communication program to establish a communications link between the machine tool control system and the diagnostic computer across the communication channel. When the auto answer MODEM is accessed by the auto dialer, the auto answer MODEM generates an interrupt causing processor 16 of diagnostic computer 15 to commence execution of the communications program stored at memory location 20e. Once execution of the communications program is commenced, diagnostic computer 15 transmits an acknowledge signal across the communication channel to the machine tool control system (step 200). As previously indicated, once the machine tool control system receives the acknowledgement signal from the diagnostic computer, the machine tool control system transmits its identification code which is received by the diagnostic computer (step 201). The identification code is then checked (step 202) to ascertain whether in fact it is valid. If the code is invalid, then execution of the communication is ended (step 216) and the communication link is broken. When the identification code received from the machine tool control system is valid, then processor 16 causes an acknowledgement signal to be transmitted (step 204) to the machine tool control system.

Following transmission of the acknowledgement signal, processor 16 of diagnostic computer 15 then searches either or both of disk drive 22 and magnetic tape 24 (step 206) to obtain the stored data indicative of the machine tool operating parameters which correspond to the machine tool identified by the previously received identification code. Thereafter, the appropriate diagnostic programs are transmitted (step 208) to the machine tool control system for later execution. The communication programs at the machine tool and the diagnostic computer continue to remain active to permit the transmission of diagnostic data from the machine tool to the diagnostic computer as will be described below.

Referring back to FIG. 2A, following transmission by the diagnostic computer of the diagnostic computer programs to the machine tool (step 208, FIG. 2B), which programs comprise the computer executable diagnostic program and machine tool executable diagnostic program stored in memory locations 20a and 20b (FIG. 1) and described in greater detail in my previously identified patent, these diagnostic programs are executed by machine tool processor (step 116) in conjunction with the temporary diagnostic program stored in memory location 36b (FIG. 1) to generate data indicative of machine tool operating parameters. This data is then transmitted (step 118) across communication channel 48 during execution of the communications program resident at the machine tool computer. Processor 16 of diagnostic computer 15 receives the diagnostic data during execution of the communication program (step 210, FIG. 2B) and then commences execution of the analytic programs stored in memory block 20c (step 212, FIG. 2B) which programs, are substantially identical to the analytic programs described in my previously identified patent. Following execution of the analytic programs which provide an analysis of the machine tool and machine tool control system data to determine the nature of the machine tool fault, information, indicative of the machine tool malfunction, is thereafter transmitted across communication channel 48 (step 212) during execution of the communication program of FIG. 2B to machine tool control system 30 for receipt and display (step 120, FIG. 2A) on data display unit 42. In accordance with the diagnostic information displayed on display unit 42, appropriate measures can then be undertaken to correct any machine tool or machine tool control system malfunction, thereby permitting the machine to resume a normal machining operation at which time execution of the communication program resident at the machine tool (FIG. 2A) ends (step 122) and execution of the communication program resident at the diagnostic computer (FIG. 2B) also ends (step 216).

Once the machine tool fault has been located and steps have been undertaken to correct the fault, it would be prudent to reconnect the diagnostic computer to the machine tool and re-test the machine tool to determine whether such corrective steps have, in fact, remedied the underlying malfunction.

The foregoing describes an unmanned diagnostic communication system for analyzing machine tool operating data and to diagnose any machine tool malfunctions identified by such data. By employing means in the form of an auto dialer and MODEM located at the machine tool, and auto answer MODEM located at the site of the diagnostic computer communication link can be established therebetween across a communications channel automatically, thereby obviating the need to manually establish such linkage.

Although the illustrative embodiment of the invention has been described in considerable detail for the purpose of fully disclosing a practical operative structure incorporating the invention, it is to be understood that the particular apparatus shown and described is intended to be illustrative only and that various novel features in the invention may be incorporated in other structural forms not departing from the spirit and scope of the invention as defined in the subjoined claims.

The principles of this invention having now been fully explained in connection with the foregoing, I hereby claim as my invention:

1. An unmanned diagnostic communication system for automatically analyzing the operation of a remotely situated computer controlled machine tool and for diagnosing abnormalities disclosed during machine tool operation comprising:
   a diagnostic communication computer system including
   means for automatically monitoring the operation of a remotely situated computer controlled machine tool following establishment of a communication link between the remotely situated computer controlled machine tool;
   means for automatically selecting a predetermined diagnostic program in response to identifying data indicative of the machine tool type and for causing said program to be executed by said machine tool; and
   means responsive to the receipt of data from said machine tool produced upon execution of said predetermined diagnostic program for automatically diagnosing any machine tool abnormalities in accordance with the said data produced by said machine tool upon execution of said predetermined diagnostic program;
   a communication channel between said diagnostic communication computer system and the remotely situated computer controlled machine tool for carrying instructions from the diagnostic communication computer system to the remotely situated computer controlled machine tool to direct machine tool operation and for carrying data from the remotely situated computer controlled machine tool indicative of the machine tool type and indicative of machine tool operating characteristics to said diagnostic communication computer system; and
   means coupled between said communication channel and said diagnostic communication system and coupled between said communication channel and the remotely situated computer controlled machine tool for automatically establishing a communications link across said communication channel between said diagnostic communications system and a remotely situated computer controlled machine tool in response to a command generated by the remotely situated computer controlled machine tool.

2. The invention according to claim 1 wherein said diagnostic communications computer system comprises:
   a processor;
   a first block of logical memory containing an operating system for directing the operation of said processor;
   a second block of logical memory containing computer executable diagnostic programs which, when executed by the machine tool control system of a computer contolled machine tool, cause the transmission across said communications channel to said processor of data indicative of machine tool control system operating characteristics;
   a third block of logical memory containing machine tool executable diagnostic programs which, when executed by the machine tool control system of a computer controlled machine tool, cause the transmission of data across said communication channel to said processor indicative of machine tool operating characteristics;
   a fourth block of logical memory containing analytic programs which, when executed by said processor, allows said processor to diagnose computer controlled machine tool abnormalities from said data transmitted across said communication channel indicative of the machine tool control system operating characteristics and machine tool operating characteristics;
   a fifth logical memory block containing a communications program which when executed by the processor facilitates the establishment of a communications link to the computer controlled machine tool across said communications channel;
   an input/output interface for coupling said processor to said means for automatically establishing a communication link between said diagnostic communication system and said remotely situated computer controlled machine tool; and
   a disk drive coupled through said input/output interface to said processor for storing information indicative of the type of computer numerically controlled machine tool interfacing said diagnostic communication system and of the type of computer executable diagnostic program and machine tool executable diagnostic program to be transmitted from said second and said third memory blocks, respectively, to said machine tool control system during diagnostic analysis thereof.

3. The invention according to claim 1 wherein said communication channel comprises a long distance telephone line.

4. The invention according to claim 1 wherein said communication channel comprises a microwave link coupled at each end to a local telephone line.

5. The invention according to claim 1 wherein said means for automatically establishing a communication link between said diagnostic communication system and the remotely situated computer controlled machine tool comprises:
   an auto dialer coupled between the control system of a computer controlled machine tool and said communication channel for automatically transmitting an identifying code in response to a test command;

a communications modulator/demodulator coupled in parallel with said auto dialer for transmitting data between said communications channel and the machine tool control system; and an auto answer communications modulator/demodulator coupled between said communications channel and said diagnostic computer, said auto answer modulator/demodulator being automatically operative in response to the identifying code transmitted by said auto dialer across said communication channel to transmit data between said communication channel and said diagnostic computer.

6. A method for automatically analyzing and diagnosing the operation of a computer numerically controlled machine tool comprising the steps of:

(a) transmitting a signal from the computer numerically to the remotely situated diagnostic computer in response to a signal generated upon occurrence of a machine tool fault;

(b) establishing a communications link across the communication channel between the remotely situated diagnostic computer and the computer numerically controlled machine tool in response to said signal received from said machine tool;

(c) transmitting an identification code from said machine tool, indicative of the type of machine tool, following establishment of a communication link between the remotely situated diagnostic computer and the computer numerically controlled machine tool;

(d) ascertaining whether or not said identification code is proper and continuing performance of subsequent method steps only in response to a valid identification coding;

(e) having said diagnostic computer select an appropriate set of diagnostic programs to be executed by the computer numerically controlled machine tool in accordance with the identification code transmitted by the computer numerically controlled machine tool;

(f) initiating execution by the machine tool of said appropriate set of diagnostic programs selected in accordance with the transmitted identification code to enable the machine tool to develop diagnostic data indicative of machine tool operation during diagnostic program execution;

(g) transmitting said diagnostic data developed by the machine tool during diagnostic program execution to the remotely situated diagnostic computer;

(h) initiating execution by the remotely situated diagnostic computer of a selected set of analytic programs to analyze the diagnostic data to diagnose machine tool faults, if any;

(i) transmitting the analysis of said diagnostic data to the machine tool; and (j) displaying the analysis of the analytic program execution to an operator.

7. A method for automatically analyzing and diagnosing the operation of a computer numerically controlled machine tool comprising the steps of:

(a) transmitting a signal from the computer numerically controlled machine tool to a remotely situated diagnostic computer across a communication channel in response to a signal generated upon occurrence of a machine tool fault;

(b) automatically transmitting an acknowledgment signal from the remotely situated diagnostic computer to the machine tool across the communication link upon receipt of that signal from the machine tool;

(c) transmitting an identification code from the machine tool to the remotely situated diagnostic computer indicative of the type of machine tool following receipt of the acknowledgment signal from the remotely situated diagnostic computer;

(d) ascertaining whether or not the identification code is proper;

(e) ending communication between the machine tool and the diagnostic computer following receipt of an invalid identification code and maintaining communication between the diagnostic computer and the machine tool following receipt of a valid identification code;

(f) searching a memory at the remotely situated diagnostic computer containing sets of diagnostic programs for the appropriate diagnostic programs for the machine tool, the location of the appropriate set of diagnostic programs being determined from the identification code received by the diagnostic computer from the computer numerically controlled machine tool;

(g) transmitting the appropriate set of diagnostic programs from the diagnostic computer to the machine tool across the communication channel;

(h) causing the machine tool to execute the appropriate set of diagnostic programs during execution of said appropriate set of diagnostic programs to the remotely situated diagnostic computer;

(i) transmitting said diagnostic data developed by the machine tool during diagnostic program execution to the remotely situated diagnostic computer;

(j) automatically initiating execution by the remotely situated diagnostic computer of a set of analytic programs to analyze the diagnostic data to diagnose machine tool faults if any;

(k) transmitting the analysis of said diagnostic data to the machine tool;

(l) displaying the analysis of the analytic program execution to an operator.

* * * * *